United States Patent
Cheah et al.

(10) Patent No.: US 7,737,949 B2
(45) Date of Patent: Jun. 15, 2010

(54) DRIVING CIRCUIT ADAPTED FOR USE IN OPTICAL MICE

(75) Inventors: Chiang Sun Cheah, Bagan Lallang (MY); Shan Chong Tan, Besar (MY); Ju Chin Poh, Sungai Mati (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1011 days.

(21) Appl. No.: 11/439,301

(22) Filed: May 22, 2006

(65) Prior Publication Data

US 2007/0268254 A1    Nov. 22, 2007

(51) Int. Cl.
*G06F 3/033* (2006.01)
(52) U.S. Cl. ......................................... 345/166; 345/46
(58) Field of Classification Search .................. 345/163, 345/165, 166, 43–46; 324/713, 719
See application file for complete search history.

(56) References Cited

U.S. PATENT DOCUMENTS

| | | | | |
|---|---|---|---|---|
| 5,045,843 A | * | 9/1991 | Hansen | 345/158 |
| 6,825,619 B2 | * | 11/2004 | Norris | 315/149 |
| 7,317,447 B2 | * | 1/2008 | Tan et al. | 345/166 |
| 2006/0119592 A1 | * | 6/2006 | Wang et al. | 345/204 |
| 2007/0262920 A1 | * | 11/2007 | Werner et al. | 345/46 |
| 2007/0268028 A1 | * | 11/2007 | Moyer et al. | 324/713 |

* cited by examiner

*Primary Examiner*—Chanh Nguyen
*Assistant Examiner*—Kwang-Su Yang

(57) ABSTRACT

A control circuit having a drive circuit and a controller adapted for use in optical mice is disclosed. The drive circuit is connected between first and second ports and passes a current between those ports having an amplitude determined by a control signal that is generated by the controller. The first port is connected to an illumination device and the second port is connected to a power rail. The control circuit also includes a potential measuring circuit that generates a signal indicative of a drive circuit potential between the first and second ports. The controller records the drive circuit potential for a predetermined current when the first port is connected to an illumination device. The controller sets the control signal based on the recorded drive circuit potential. The control circuit can record the drive circuit potential when the controller is powered.

7 Claims, 3 Drawing Sheets

DRIVING CIRCUIT ADAPTED FOR USE IN OPTICAL MICE

BACKGROUND OF THE INVENTION

Pointing devices for use in computers, and the like, are well known. These devices are often referred to as mice. In general, a mouse is a handheld device that is moved by the user over a surface to control the movement of a cursor on a display screen that is connected to the mouse. Typically, the cursor is moved in a direction and by an amount determined by the amount that the mouse moved over the surface. The original mice sensed the motion of a handheld device over a surface using mechanical means such as a ball that rolled against a set of rollers as the mouse was moved over the surface. However, this type of mechanical system suffered from a number of problems such as the accumulation of grease and other debris on the rollers as a result of material picked up from the surface by the ball.

These problems have been overcome by mice based on optical sensing. An optical mouse typically includes a light source that illuminates the surface under the device at an oblique angle and a camera that takes a series of pictures of the illuminated surface. The light source typically includes a light-emitting diode (LED) and a lens for directing the light to the appropriate area of the surface at an angle that enhances any surface roughness. By comparing successive pictures, the mouse controller can determine the distance and direction that the mouse moved between the two pictures. This comparison typically involves shifting one of the images relative to the other and then computing some measurement of the correlation of the two images. The shift that provides the maximum correlation is then assumed to be the amount of displacement of the mouse between the two pictures.

These devices work well on surfaces that have a texture that gives rise to images that can easily be compared to one another by shifting one of the images. However, many surfaces are less than ideal. For example, a conventional optical mouse moving over a glass surface performs poorly, if at all, either because the surface is too smooth to provide the desired image or because the surface is transparent, and the underlying surface is out of focus. Other surfaces provide tracking information that has insufficient precision for many applications.

To provide optical mice that perform better on these less than ideal surfaces, optical mice having a laser diode in place of the LED have been developed. When the surface is illuminated with coherent light from the laser, the resulting images are enhanced due to the interference of the coherent light reflected from the surface. Optical mice based on a number of such interference effects have been suggested.

While these coherent light mice provide improvement over the LED-based mice, they do so at an increased cost. Hence, manufacturers of mice tend to offer a range of products having different levels of performance and different costs. The mice can differ in the light source, the image sensor, or the complexity of the control chip that controls the image sensor and computes the movement of the mouse over the surface. As a result, the manufacturer must stock parts for many mouse designs. The introduction of laser-based mice has further increased the number of parts that must be maintained in inventory. In general, the mouse includes a controller chip that sets the current that flows through the light source and performs the various calculations needed to compute a displacement. LED light sources require different driver circuits than laser diode light sources. Hence, the manufacturer must stock both new controller chips and lasers in addition to the parts utilized in the assembly of LED-based mice. In addition, the design time associated with developing a new optical mouse having a different light source from those currently used is increased by the need to provide a new control chip for the new light source.

In principle, the driver circuitry could be located on a separate chip so that the same controller chip could be used for both mice based on LEDs and lasers. However, this solution increases the cost of both types of mice. Such cost issues are particularly important in low-cost mice.

SUMMARY OF THE INVENTION

The present invention includes a control circuit having a drive circuit and a controller. The drive circuit is connected between first and second ports and passes a current between those ports having an amplitude determined by a control signal that is generated by the controller. The first port is connected to an illumination device and the second port is connected to a power rail. The control circuit also includes a potential measuring circuit that generates a signal indicative of a drive circuit potential between the first and second ports. The controller records the drive circuit potential for a predetermined current when the first port is connected to an illumination device. The controller sets the control signal based on the recorded drive circuit potential. The control circuit can record the drive circuit potential when the controller is powered on at one or more current values between the first and second ports.

DETAILED DESCRIPTION OF THE PREFERRED EMBODIMENTS OF THE INVENTION

Figure 1:
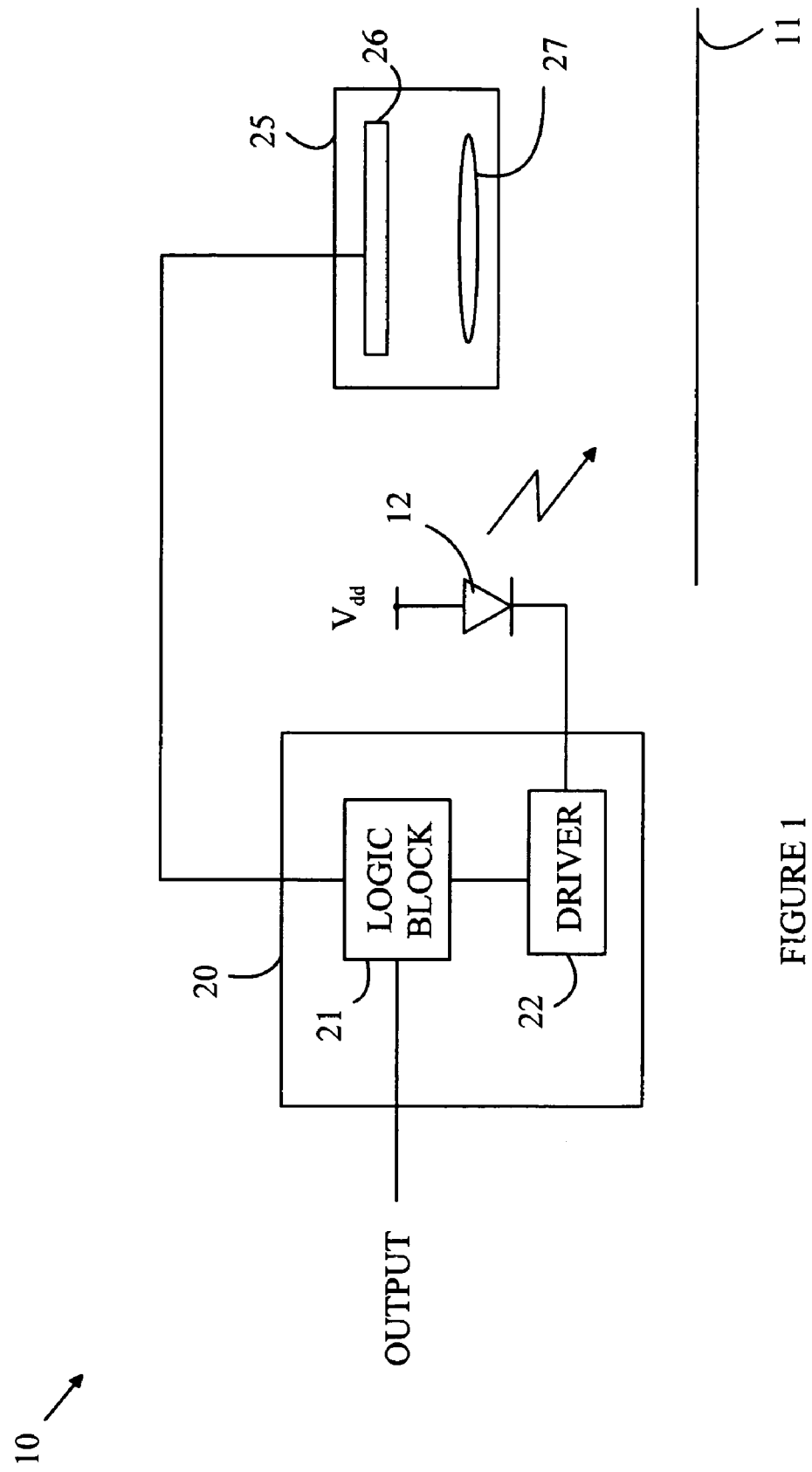
FIG. 1 illustrates the basic building blocks for an optical mouse.

The manner in which the present invention provides its advantages can be more easily understood with reference to FIG. 1, which illustrates the basic building blocks for an optical mouse. Optical mouse 10 includes a light source 12 that illuminates a portion of a surface 11 over which the optical mouse is moved. Light from the illuminated portion of surface 11 is imaged in a camera 25 that includes an imaging lens 27 and a photodiode array 26. Successive images from camera 25 are processed in a control chip 20 having a digital logic block 21. Control chip 20 also includes a current driver 22 that controls the light output from light source 12.

In practice, a continuous series of pictures are taken by camera 25. Typically, turning light source 12 on and off provides the shutter function. Successive pictures are compared to one another by shifting one picture and computing the correlation of that picture with the previous picture. The correlation computation is performed for a number of different shifts to determine the shift that produces the highest correlation. That correlation provides a measure of the distance and direction in which the optical mouse moved between the two pictures.

In more expensive mice that run on batteries, logic block 21 also adjusts the current flowing through light source 12 during the periods in which light source 12 is on to reduce the power required to operate the optical mouse. This feature increases the battery lifetime and can also be used to optimize the performance of the mouse by assuring that the pictures have more optimal exposures.

In general, the current needed to operate a semiconductor laser is significantly different from that needed to operate an LED. Hence, even in mice that include a variable current source in driver 22, a different current driver is needed if the LED is replaced by a semiconductor laser. In addition, even if the current driver has sufficient range to supply both types of light source, the logic block must be programmed to switch from the range associated with an LED to that associated with a laser. This procedure requires that the manufacturer or assembler of the mouse set a bit in a register in logic block 21. If a chip having an incorrectly set bit is used, the resultant mouse will not function properly, and, in addition, could pose a safety hazard. In this regard, it should be noted that semiconductor lasers require lower power to produce a given level of light. If a controller that is set for an LED is used to power a laser diode such as a VCSEL, the laser diode will emit significantly more light than needed by the camera. In some case, the light level is sufficient to damage the eye of a user if the user turns the mouse over and looks at the light source.

The present invention avoids this problem by providing a universal drive chip that automatically determines the type of device attached thereto and adjusts the current source accordingly. The present invention makes use of the observation that laser diodes have different impedances that LEDs, and hence, by measuring the impedance of the attached device, the driver can determine the type of light source connected thereto.

Figure 2:
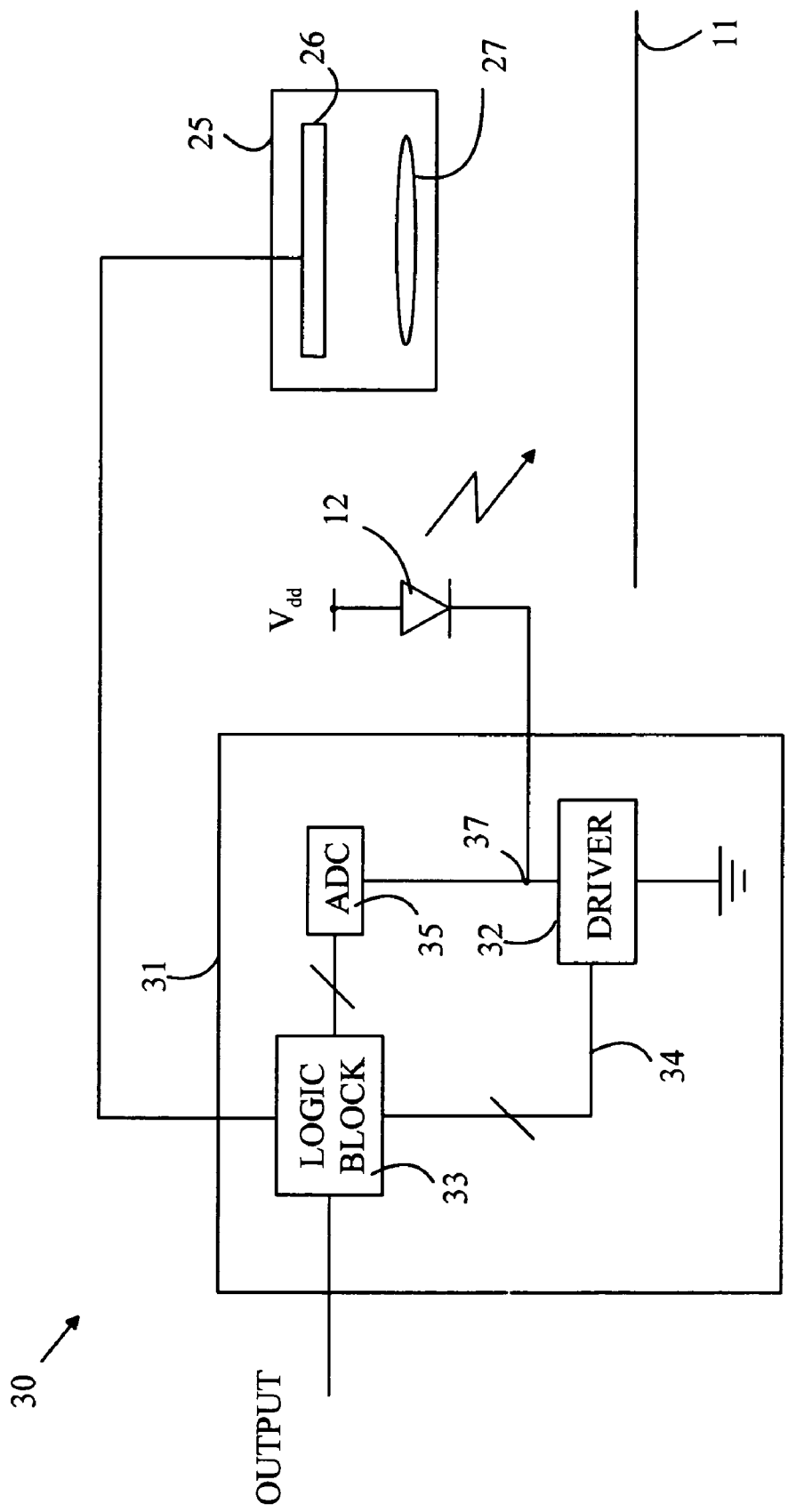
FIG. 2 illustrates one embodiment of an optical mouse according to the present invention.

Refer now to FIG. 2, which illustrates one embodiment of an optical mouse according to the present invention. To simplify the following discussion, those elements of optical mouse 30 that serve functions analogous to those discussed above with respect to FIG. 1 have been given like reference numerals and will not be discussed further here. Optical mouse 30 includes a control chip 31 having a controllable current driver 32 that is under the control of logic block 33. The current sinked to ground by driver 32 is determined by digital control signals on bus 34. Control chip 31 also includes an analog-to-digital converter 35 that measures the voltage at the node between light source 12 and driver 32. The measured voltage is communicated to logic block 33.

If $V_{dd}$ is known to sufficient accuracy, a measurement to the potential at node 37, $V_{37}$, can provide a measure of the impedance, R, of light source 12 if light source 12 is well approximated by a resistor. However, $V_{dd}$ can vary from mouse to mouse within a significant range, and the light source has a threshold potential. Hence, two measurements at different currents are needed. In either case, on power up, logic block 33 measures the impedance of light source 12 by setting the current through light source 12 and then measuring the potential at node 37 for one or more current values. To provide eye safety, the logic block performs this measurement at the lowest current setting at which an accurate measure of the impedance of light source 12 can be obtained.

It has been found experimentally that LEDs have impedances that are a fraction of the impedance of VCSELs used in optical mice. For example, in one experiment it was found that the impedance of a number of LEDs varied from about 15 ohms to 22 ohms for currents in 5 to 6 mA range, while the impedance of the VCSELs varied from 85 to 300 ohms in the same current range.

In one embodiment of the present invention, logic block 33 includes a calibration table that relates the measured impedances to the allowable current ranges for powering light source 12. Hence, the user is not required to program control chip 31, thereby eliminating the potential for errors in such programming. To provide for eye safety, logic block 33 selects the laser diode current range if the measured impedance is greater than a predetermined value or if the measured impedance does not match a predetermined range of impedances that characterize the allowable LEDs for which the control chip was designed.

In the above-described embodiments, an impedance value is computed from two potential measurements at different currents. However, more complex measurements can be made to better characterize the light source or detect a part that might be failing. For example, a voltage as a function of current curve could be provided for a larger number of current values. This curve would then be matched to calibration curves stored in logic block 33. The calibration curves could include curves measured from light sources that have aged or have known other defects. Hence, the optical mouse could provide an indication that the light source was nearing the end of its life. Alternatively, logic block 33 could adjust the current ranges to compensate for the aging based on the measured potential curve.

Figure 3:
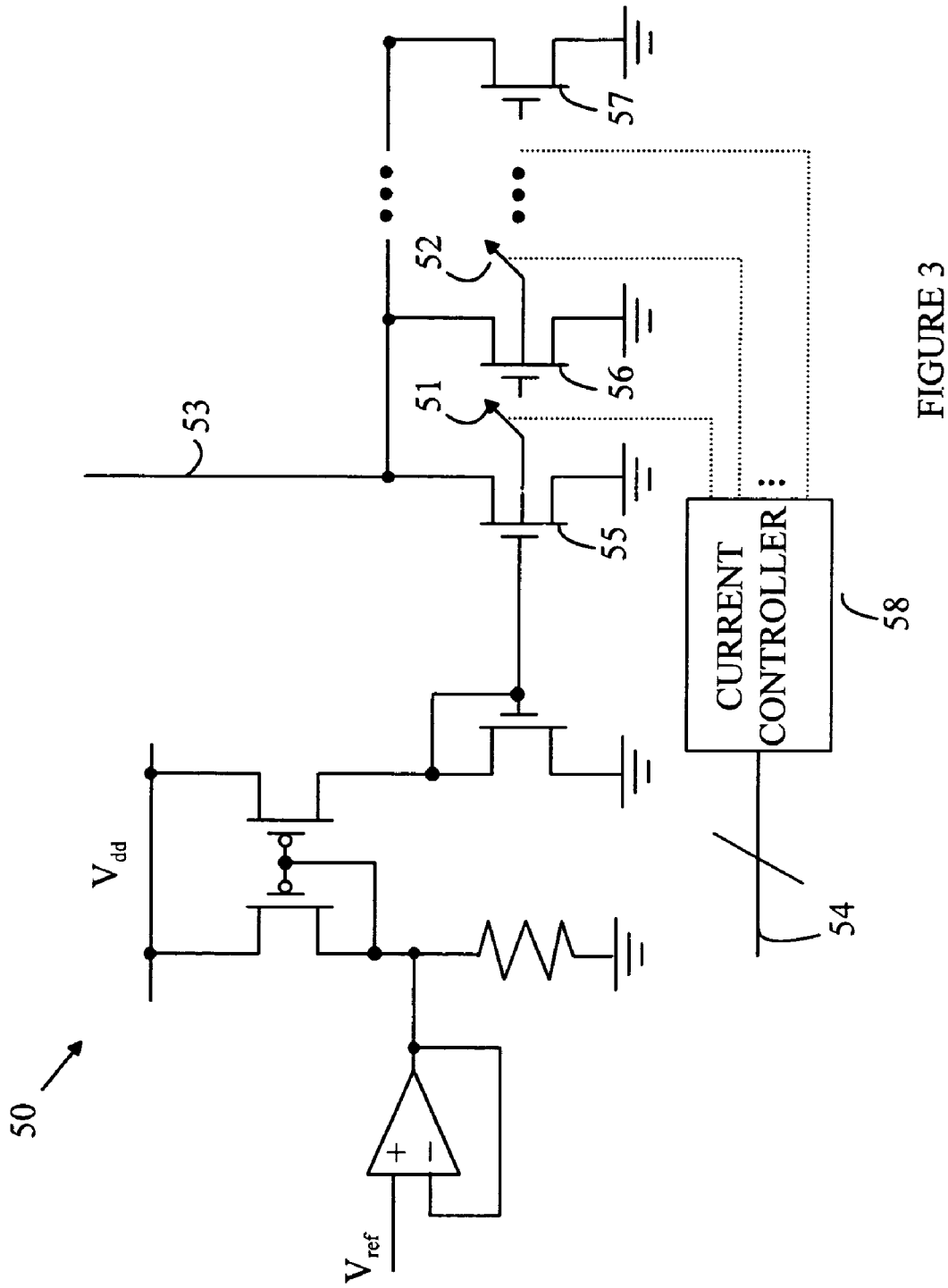
FIG. 3 illustrates a driver that sets the current through the light source in response to a digital control signal.

The embodiments of the present invention discussed above rely on a driver that sets the current through the light source in response to a digital control signal. Such drivers are conventional in the electronic arts, and hence, will not be discussed in detail here. An example of such a circuit is shown in FIG. 3 at 50. Driver 50 is analogous to a current mirror in which the current flowing through the load on line 53 is set by the current flowing through a plurality of transistors such as transistors 55-57. If the transistors have identical widths, the current will be proportional to the number of transistors that are in the conducting state at any given time. A set of switches such as switches 51-52 control which transistors are currently in the conducting state. These switches are activated by current controller 58 in response to control signals on bus 54. If the transistors have different channel widths, the relationship between the control bits and the current provided by the driver can be altered to a scheme that is determined by the ratio of the channel widths of the various transistors.

In the above-described embodiments, the current driver operates between an input port that is connected to the illumination device and ground. The ground connection, however, can be replaced by a port that is connected to one of the power sources. The particular power source depends on the specifics of the driver circuit design.

The embodiments described above utilize an analog-to-digital circuit for measuring the potential at the port connected to the illumination device. However, other potential measuring circuits could be utilized. The analog-to-digital converter is well adapted to logic blocks that are constructed from digital circuits. However, it will be appreciated that analog circuitry could be utilized to measure and store the potential on the illumination device port and to compare that potential at each of the test current to analog values stored in the control chip. Similarly, the drive circuit could be replaced by a drive circuit that is controlled using analog voltages.

Various modifications to the present invention will become apparent to those skilled in the art from the foregoing description and accompanying drawings. Accordingly, the present invention is to be limited solely by the scope of the following claims.

What is claimed is:

1. A control circuit comprising:
 a first port for connecting an illumination device;
 a second port connecting said control circuit to a power supply;

a drive circuit connected to said first port, said drive circuit passing a current between said first port and said second port having an amplitude determined by a control signal connected thereto;

a potential measuring circuit that generates a signal indicative of a drive circuit potential between said first and second ports; and a controller that generates said control signal, wherein said controller records said drive circuit potential for a predetermined current when said first port is connected to an illumination device and said controller sets said control signal based on said recorded drive circuit potential, said controller being configured to set said control signal to provide a first drive current suitable for semiconductor lasers when said drive circuit potential indicates that said illumination device is a semiconductor laser, said controller being configured to set said control signal to provide a second drive current suitable for light-emitting diodes when said drive circuit potential indicates that said illumination device is a light-emitting diode, wherein said controller determines an impedance for said illumination device and compares that impedance to impedance values in a table stored in said controller, and wherein said impedance is determined by measuring said drive circuit potential when first and second currents are caused to flow through said illumination device.

2. The control circuit of claim 1 wherein said controller records said drive circuit potential when said controller is powered on.

3. The control circuit of claim 1 wherein said controller sets said control signal to a first value if said impedance is greater than a predetermined value and to a second value if said impedance value is less than said predetermined value.

4. The control circuit of claim 3 wherein said current passed by said drive circuit when said control signal has said first value is less than said current passed by said drive circuit when said control signal has said second value.

5. The control circuit of claim 1 further comprising an imaging port for receiving an image recorded by a photodiode array, wherein said controller determines a displacement value for a pointing device containing said control circuit and said photodiode array based on said received image.

6. The control circuit of claim 5 wherein said control circuit is contained in a single die.

7. A control circuit comprising:

a first port for connecting an illumination device;

a second port connecting said control circuit to a power supply;

a drive circuit connected to said first port, said drive circuit passing a current between said first port and said second port having an amplitude determined by a control signal connected thereto;

a potential measuring circuit that generates a signal indicative of a drive circuit potential between said first and second ports; and a controller that generates said control signal, wherein said controller records said drive circuit potential for a predetermined current when said first port is connected to an illumination device and said controller sets said control signal based on said recorded drive circuit potential, said controller being configured to set said control signal to provide a first drive current suitable for semiconductor lasers when said drive circuit potential indicates that said illumination device is a semiconductor laser, said controller being configured to set said control signal to provide a second drive current suitable for light-emitting diodes when said drive circuit potential indicates that said illumination device is a light-emitting diode, and wherein said controller is configured to set said control signal to provide said first drive current when said drive circuit potential corresponds to impedance between 15 ohms to 22 ohms as a result of a test current being provided to said illumination device, said test current being between 5 mA to 6 mA, and wherein said controller being configured to set said control signal to provide said second drive current when said drive circuit potential corresponds impedance between 85 ohms to 300 ohms as a result of said test current being provided to said illumination device.

* * * * *